Figure 1:
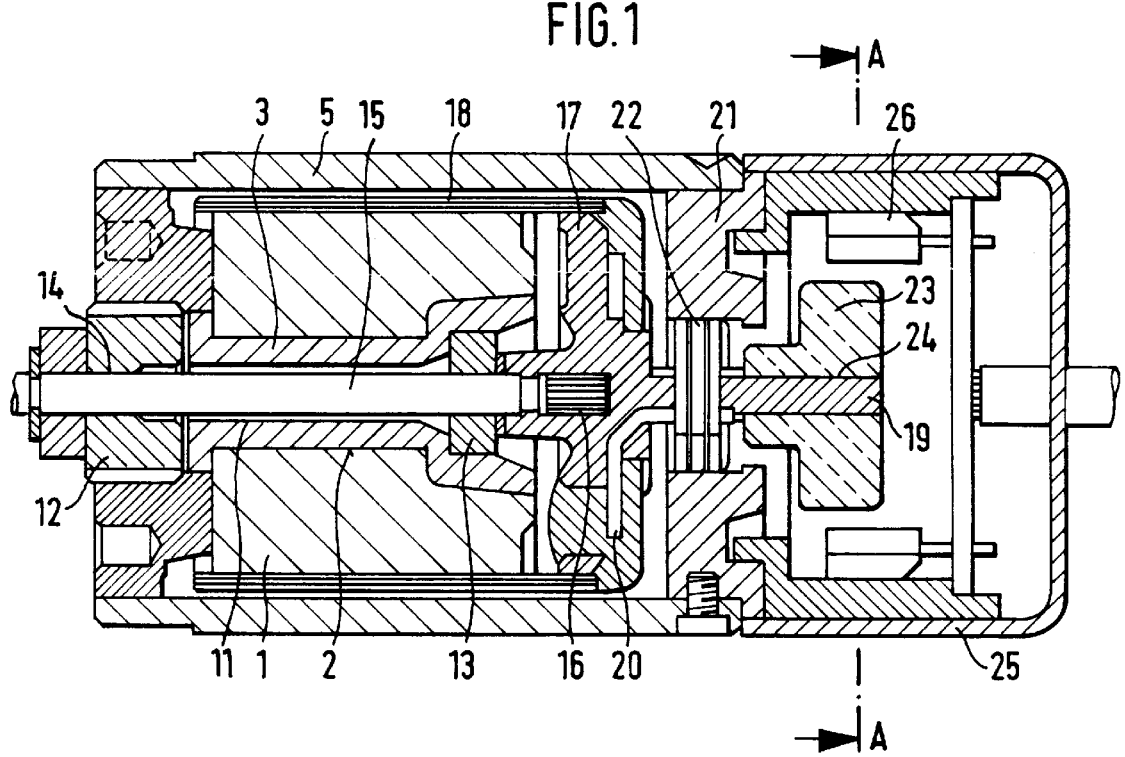

United States Patent

Mayer et al.

[11] Patent Number: 5,920,134
[45] Date of Patent: Jul. 6, 1999

[54] DC MOTOR

[75] Inventors: Jürgen Mayer; Arnold Teimel, both of Sachseln, Switzerland

[73] Assignee: Interelectric AG, Sachseln, Switzerland

[21] Appl. No.: 08/717,688

[22] Filed: Sep. 23, 1996

[30] Foreign Application Priority Data

Sep. 26, 1995 [DE] Germany .................. 295 15 381 U
Apr. 10, 1996 [DE] Germany .................. 196 14 216

[51] Int. Cl.⁶ ............................................. H02K 23/66
[52] U.S. Cl. ............................ 310/40 MM; 310/233; 310/235
[58] Field of Search .................. 310/68 B, 154, 310/263, 40 MM, 233, 235, 237

[56] References Cited

U.S. PATENT DOCUMENTS

| | | | |
|---|---|---|---|
| 3,693,024 | 9/1972 | Hulle et al. | 250/231 SE |
| 4,173,822 | 11/1979 | Futterer et al. | 29/596 |
| 4,529,401 | 7/1985 | Leslie et al. | 604/131 |
| 4,710,683 | 12/1987 | Bahn et al. | 318/254 |
| 4,843,388 | 6/1989 | Miyamoto | 341/15 |
| 5,073,710 | 12/1991 | Takagi et al. | 250/231.14 |
| 5,450,770 | 9/1995 | Bellemore et al. | 74/574 |
| 5,545,985 | 8/1996 | Campbell | 324/207.21 |
| 5,729,070 | 3/1998 | Okuyama et al. | 310/235 |
| 5,793,128 | 8/1998 | Nanba et al. | 310/12 |

FOREIGN PATENT DOCUMENTS

| | | | |
|---|---|---|---|
| 2278187 | 7/1975 | France | H02K 5/04 |
| 1 948 906 | 4/1971 | Germany | H02H 7/093 |
| 24 33 770 | 1/1976 | Germany | H02K 1/12 |
| 27 48 502 | 5/1979 | Germany | G01P 3/44 |
| 28 10 821 | 9/1979 | Germany | H02K 23/56 |
| 81 451 U | 3/1982 | Germany | H02K 7/18 |
| 3441 429 | 5/1985 | Germany | H03K 13/18 |
| 87 13 170 U | 9/1988 | Germany | G01D 5/36 |
| GM 80 07 170 | 10/1988 | Germany | H02K 11/00 |
| 88 11 966 U | 8/1989 | Germany | H02K 11/00 |
| 90 06 935 U | 6/1990 | Germany | H02K 11/00 |
| 39 39620 | 6/1991 | Germany | G01B 11/26 |
| 41 29 651 | 9/1993 | Germany | H02K 11/00 |
| 43 11 267 | 10/1994 | Germany | G01D 5/12 |
| 43 26 391 | 2/1995 | Germany | H02K 23/66 |
| 52-87799 | 6/1977 | Japan | H02K 23/66 |
| 975299 | 11/1964 | United Kingdom . | |
| 1031770 | 6/1966 | United Kingdom | H02K 23/00 |
| 1090937 | 11/1967 | United Kingdom | H02K 3/44 |
| 2161031 | 6/1985 | United Kingdom | H02K 23/68 |
| 59033428 | 9/1985 | United Kingdom | H02K 9/06 |

*Primary Examiner*—Thomas M. Dougherty
*Attorney, Agent, or Firm*—Tilton, Fallon, Lungmus & Chestnut

[57] ABSTRACT

The present invention refers to a dc motor, in particular a micro dc motor, comprising a shaft and a collector element arranged on said shaft and consisting of a collector plate and a collector which projects from said collector plate beyond the shaft end, the collector element being extended beyond the collector so as to form a shaft section on the side facing away from the collector plate, said shaft section being adapted to have attached thereto an additional component part. In accordance with a preferred embodiment, the dc motor is provided with an incremental angle-position encoder comprising an encoder element, the encoder element being fixedly attached to the collector element, which is extended so as to form a shaft section, and constituting the additional component part.

16 Claims, 1 Drawing Sheet

DC MOTOR

The present invention refers to a dc motor, in particular a micro dc motor, comprising a shaft and a collector element arranged on said shaft and consisting of a collector plate and a collector which projects from said collector plate beyond the shaft end.

In recent years, there has been an increasing industrial demand for dc motors which are equipped with additional component parts, e.g. with an integrated incremental angle-position encoder.

In order to meet this demand in industry, various solutions have been attempted. It is, for example, known to secure the encoder disc of the incremental angle-position encoder directly to the collector plate. Especially in cases where encoder discs with magnetic poles are used, interactions with the field of the stator magnet may, however, occur, said interactions causing axial vibrations.

Optical encoder discs attached to the collector plate are impaired with regard to their operational reliability, e.g. due to contamination by lubricant particles when metal brushes are used and due to contamination by carbon dust when carbon brushes are used.

In contrast to the above-mentioned arrangement of the incremental angle-position encoder, the most frequently used method employs the measure of attaching the incremental angle-position encoder to one end of the shaft when the motor has been finished, or rather when it has been mounted. For this purpose, the motor must have a continuous shaft. In comparison with a motor without a continuous shaft, a motor having a continuous shaft requires, however, a larger diameter of the collector. The larger collector, however, entails a higher brush abrasion, and this reduces the service life of the motor.

Especially with respect to micromotors, the applicability of the latter method is, however, very limited. In this connection, it is primarily necessary to take into account the problems arising when the shaft is produced. Whereas the shaft for large motors can be produced in any desired length, the production of longer shafts for micromotors entails a substantial expenditure in the field of production engineering. In this connection, reference must especially be made to the high demands which are to be satisfied with regard to the dimensional accuracy of such microshafts. The narrow tolerances permitted for the shaft have the effect that a high percentage of useless shafts, or rather shafts which are not suitable for use in motors, is produced when the shafts are being manufactured so that bottlenecks with regard to the delivery of such shafts may perhaps be caused. Furthermore, the production of shafts for micromotors is expensive and time-consuming.

It is therefore the object of the present invention to provide a dc motor, especially a micro dc motor with an additional component part, which overcomes the disadvantages of the known motors.

In the case of a dc motor, in particular a micro dc motor, comprising a shaft and a collector element arranged on said shaft and consisting of a collector plate and a collector which projects from said collector plate beyond the shaft end, this object is achieved by the features that on the side facing away from the collector plate, the collector element is extended beyond the collector so as to form a shaft section, which is adapted to have fixedly attached thereto an additional component part.

On the basis of the dc motor according to the present invention, a motor is provided which is adapted to be connected to additional components in a very simple manner. The connection element used for this purpose is an extension of the shaft, said extension being formed by the collector element, so that the problems resulting from the production of very long shafts in the case of known motors are avoided. In addition, also the collector diameter can be maintained so that there will be no reduction of the service life of the motor.

A particularly advantageous feature which should be mentioned in this connection is that, independently of its future use, the collector element can always be produced such that the shaft section is formed integrally therewith by means of injection moulding; the shaft section can then be used, if required, or it can be removed before the collector element is installed in the motor. The costs entailed by the production and storage of spare parts are reduced in this way, since neither storage nor production of a great variety of parts is necessary, but one part can fulfil several functions.

In accordance with a preferred embodiment, the dc motor is provided with an incremental angle-position encoder comprising an encoder element, the encoder element being fixedly attached to the collector element, which is extended so as to form a shaft section, and constituting the additional component part.

By means of this preferred dc motor, a motor equipped with an incremental angle-position encoder is provided, which can especially be used as a micro dc motor, the known problems arising in connection with the integration of the incremental angle-position encoder being avoided in this way.

Furthermore, due to the large distance between the stator magnet and the encoder element, an interaction between these components is prevented. The mutual influence exerted by these two components was a problem in known arrangements, especially as far as the fixing of the encoder disc to the collector plate is concerned. In addition, the casing can be closed with the exception of small openings through which the encoder element is passed so that also the operational reliability in the case of optical scanning will be improved substantially.

The motor according to the present invention can be pre-mounted almost completely. The mounting of the incremental angle-position encoder is not carried out until the motor is ordered and delivered to the customer.

It turned also out to be advantageous when the encoder element receives in a central opening formed therein the shaft section which is located remote from the the collector plate, the collector element being extended by at least the end section received in the encoder element.

This embodiment permits simple and fast mounting of the encoder element on the shaft section. In order to achieve here the highest possible dimensional accuracy, the shaft section can be produced such that its diameter is larger than that of the central opening of the encoder element, and it can be remachined, e.g. by turning, prior to the fastening of the encoder element. This would also permit the elimination of defects of the shaft section.

Preferably, the encoder element consists of an encoder disc.

According to a preferred embodiment, the collector element consists of an integral injection-moulded part comprising the collector plate, the collector and the projecting shaft section.

It is, consequently, possible to produce the collector element in one working process; additional working steps are avoided so that the time required for production is not increased. In view of the fact that the shaft section can easily be removed, e.g. by cutting off or pinching off, from the component which has been produced in this way, it is not necessary to produce different collector elements which are adapted to the future intended use. This will reduce the storage costs.

The present invention additionally refers to a collector element comprising a collector plate and a collector, a central reception means for a motor shaft being provided in the area of the collector plate and the collector element being extended beyond the collector and defining a shaft section.

The collector element according to the present invention can easily be produced as an integral injection-moulded part and is characterized by the advantages described hereinbefore with regard to the collector element contained in a dc motor.

Another feature which can be provided in accordance with the present invention is that the encoder element is produced from plastic material or glass and that the code is provided in the form of optical information.

Alternatively, the encoder element can be produced from a hard-magnetic material and the code can be provided in the form of magnetic poles.

In accordance with a preferred embodiment, at least one sensor element is provided at a predetermined distance from the outer circumference of the encoder disc.

The sensor element can, for example, be an optical sensor or a magnetic sensor.

According to further preferred embodiments, the encoder disc and the shaft section can be connected by means of an adhesive or the encoder disc can be pressed onto the shaft section.

Providing a connection by means of an adhesive or by pressing the components in question together are two connection methods which can be carried out easily and which do not substantially increase the time required for production. At the same time, a fixed connection between the encoder disc and the shaft section is guaranteed.

Figure 2:
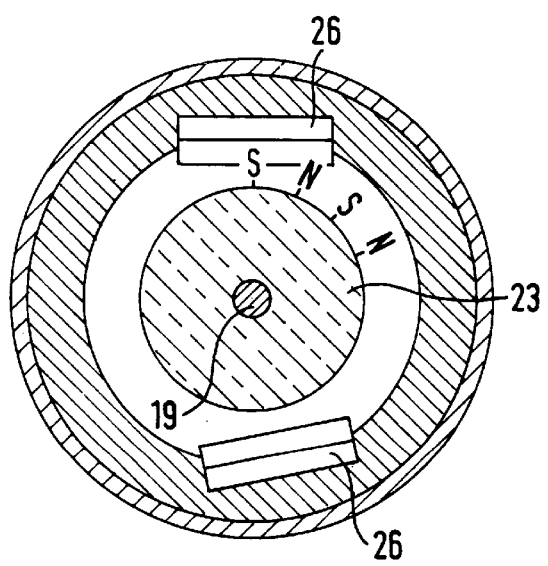

In the following, a preferred embodiment of a dc motor according to the present invention will be explained in detail making reference to drawings in which:

FIG. 1 shows an axial section through a dc motor according to the present invention, FIG. 2 shows a cross-section along the line A—A of FIG. 1.

The dc motor described hereinbelow is a motor provided with an incremental angle-position encoder. The motor according to the present invention is, however, not limited to these motors but comprises all dc motors with additional component parts.

The dc motor shown in FIG. 1 and 2 comprises a cylindrical permanent magnet 1 provided with a central opening 2. The permanent magnet is embedded in two injection-moulded parts, one of said injection-moulded parts extending through said central opening 2 and being followed by a housing end plate. A further injection-moulded part forms a jacket 5. This jacket follows the housing end plate.

The injection-moulded part 3 is provided with a central hole 11 extending throughout the whole length of said injection-moulded part and having areas of enlarged diameter at the ends thereof, said areas serving to accommodate bearings 12 an 13. These bearings are provided with bearing holes 14 receiving therein a shaft 15 whose end is provided with corrugations 16 around which a collector element is injection moulded, said collector element consisting of a collector plate 17 and a collector 19 projecting beyond the end of the shaft. The collector plate 17 carries on the largest circumference thereof a rotor winding 18. The collector 19 comprising a number of L-shaped metal lamellae 20 that are connected to the terminals of the rotor winding 18.

On the free end of the jacket 5 a brush cover 21 abuts, said brush cover 21 being provided with a plurality of brush springs 22 resting on the collector 19. The brush cover is provided with a central opening through which the collector 19 extends. The brush springs 22 abut on the section of the collector which extends through the brush cover and which is associated therewith.

On the side facing away from the collector plate, the collector element is extended beyond the collector 19 so as to form a shaft section extending beyond the brush cover 21. An encoder disc 23 is fixedly attached to the shaft section. The encoder disc consists of a stepped disc and is provided with a central opening 24. The code can be provided in the form of an optical information (transmission or reflection) or in the form of magnetic poles on a hard-magnetic carrier material.

When the dc motor is being assembled, the encoder disc 23 is attached to the shaft section so that said shaft section extends fully through the opening 24 and that the end of said shaft section is flush with the surface of the encoder disc. The present invention is, of course, not limited to this embodiment, but there are a plurality of other possibilities of connecting the shaft section to the encoder disc. For reasons of safety or in order to obtain a better connection, the encoder disc can be pressed onto the shaft section, and it is also possible to connect the encoder disc and the shaft section by means of an adhesive.

The encoder disc, which is constructed as a stepped disc, has two areas of different diameters, a first area located opposite the collector plate and having a small diameter and a second area which follows the first one and which has a larger diameter. The area having the smaller diameter can be dimensioned such that it corresponds to the diameter of the opening in the brush cover or such that it is smaller than said brush cover opening and that a predetermined percentage thereof is received in said opening.

The encoder disc secured to the shaft section is surrounded by a shield housing 25. The shield housing 25 is cup-shaped, the encoder disc 23 being received in the open end thereof. The outer circumference of the shield housing is constructed in such a way that the open end of said shield housing is adapted to be brought into engagement with the jacket 5, the shield housing forming then together with said jacket 5 an outer casing. One of the functions of the shield housing is that of a magnetic and electric shield means.

For detecting the angular position and the direction of rotation, two closely spaced sensors 26 are provided in the interior of the shield housing 25 when radial scanning is effected on the outer circumference of the encoder disc, said sensors 26 being optical or magnetic sensors depending on the type of encoder disc used. When the code is provided on the front of the encoder disc 23, axial scanning can be carried out on the basis of an appropriately changed arrangement of the sensors.

If speed control alone is to be carried out or if only one direction of rotation of the motor is possible, one sensor would be sufficient. Dending on the integrated electronics, analog signals or TTL signals are available on the output of the incremental angle-position encoder.

We claim:
1. A dc motor comprising in combination with a shaft, a collector element arranged on said shaft, said collector element including a collector plate, a collector which projects beyond the end of said shaft, and a shaft section which is integrally formed with the collector element and which extends beyond said collector facing away from said collector plate, said shaft section being adapted to have attached thereto an additional component part.

2. A dc motor according to claim 1, wherein said dc motor is provided with an incremental angle-position encoder comprising an encoder element, said encoder element being fixedly attached to said collector element and constituting said additional component part.

3. A dc motor according to claim 2, wherein said encoder element receives in a central opening formed therein said shaft section which is located remote from said collector plate, said collector element being extended by at least said shaft section received in said encoder element.

4. A dc motor according to claim 2, wherein said encoder element consists of an encoder disc.

5. A dc motor according to claim 1, 2, 3, or 4, wherein said collector element consists of an integral injection-molded part comprising said collector plate, said collector and said projecting shaft section.

6. The dc motor of claims 1, 2, 3, or 4 wherein said dc motor is a micro dc motor.

7. A dc motor according to claim 2, wherein at least one sensor element is provided at a predetermined distance from the outer circumference of said encoder element.

8. A dc motor according to claim 7, wherein said sensor element is an optical sensor.

9. A dc motor according to claim 7, wherein said sensor element is a magnetic sensor.

10. A dc motor according to claim 4, wherein said encoder disc is produced from plastic material and the code for said encoder disc is provided in the form of optical information.

11. A dc motor according to claim 4, wherein said encoder disc is produced from glass material.

12. A dc motor according to claim 4, wherein said encoder disc is produced from a hard-magnetic carrier material and the code for said encoder disc is provided in the form of magnetic poles.

13. A dc motor according to claim 2, 3, 4, 10, 11 or 7, wherein said encoder element and said shaft section are connected by means of an adhesive.

14. A dc motor according to claim 2, 3, 4, 10, 11, 12 or 7, wherein said encoder element is pressed onto said shaft section.

15. A collector element for a dc motor, said collector element integrally forming a collector plate, a collector, a shaft section, and a central reception means for a motor shaft, said central reception means being provided in the area of said collector plate, said collector element extending beyond the end of said motor shaft, said shaft section extending beyond said collector on the side of the collector facing away from the collector plate.

16. A collector element according to claim 15, wherein said collector element consists of an integral injection-molded part.

\* \* \* \* \*